United States Patent [19]

McCormack et al.

[11] Patent Number: 5,561,817
[45] Date of Patent: Oct. 1, 1996

[54] METHOD OF SECURELY CONTROLLING DIRECT MEMORY ACCESS (DMA) OF A SHARED MEMORY BY A DMA DEVICE ON AN EXPANSION BOARD

[75] Inventors: Michael D. McCormack, Robbinsdale; Romuald M. Jurewicz, St. Louis Park; Dannis R. Johnson, Savage, all of Minn.

[73] Assignee: Thermo King Corporation, Minneapolis, Minn.

[21] Appl. No.: 106,851

[22] Filed: Aug. 16, 1993

[51] Int. Cl.$^6$ .............................. G06F 13/28; G06F 12/00
[52] U.S. Cl. .................. 395/842; 395/846; 395/402; 395/475; 395/282; 364/242.3; 364/242.31; 364/929.4; 364/DIG. 1
[58] Field of Search ...................... 395/400, 425, 395/325, 842, 822, 826, 828, 846, 402, 882, 728, 186, 848, 475, 280, 281, 282

[56] References Cited

U.S. PATENT DOCUMENTS

| | | | |
|---|---|---|---|
| 4,402,191 | 9/1983 | King | 62/239 |
| 4,409,797 | 10/1983 | King et al. | 62/239 |
| 4,412,282 | 10/1983 | Holden | 395/280 |
| 4,424,684 | 1/1984 | Waldschmidt et al. | 62/448 |
| 4,885,564 | 12/1989 | Vercellotti et al. | 340/310.06 |
| 5,148,539 | 9/1992 | Enomoto et al. | 395/307 |
| 5,323,385 | 6/1994 | Jurewicz | 370/43 |
| 5,335,329 | 8/1994 | Cox et al. | 395/282 |
| 5,410,660 | 4/1995 | Divine et al. | 395/375 |

OTHER PUBLICATIONS

16 Bit Embedded Controllers Literature Order No. 270646–002 Intel Corporation 1990, pp. 4–1 through 4–168.

Primary Examiner—Glenn Gossage
Assistant Examiner—Ario Etienne
Attorney, Agent, or Firm—M. G. Panian

[57] ABSTRACT

A method of securely controlling direct memory access (DMA) in a microprocessor controlled system having a CPU on a CPU board which has an address/data bus connector for selectively connecting an expansion board to the CPU board, and a random access memory (RAM) on the CPU board having a specific address range which is accessible by a DMA device on the expansion board when the CPU board relinquishes control of the address/data bus to the DMA device in response to a bus access request. The method includes the steps of providing a plurality of logic signals, including a first logic signal having logic levels which indicate whether or not the CPU board is in control of the address/data bus, providing memory select signals for selecting different memory address ranges which are true in response to different Boolean equations each comprising predetermined combinations of predetermined logic signals, and including the first signal in the Boolean equation of at least one of the memory select signals, such that the at least one memory select signal can only be driven to a true level when the logic level of the first logic signal indicates that the CPU board is in control of the address/data bus. The method may be used to control DMA in a refrigeration related process or system.

8 Claims, 3 Drawing Sheets

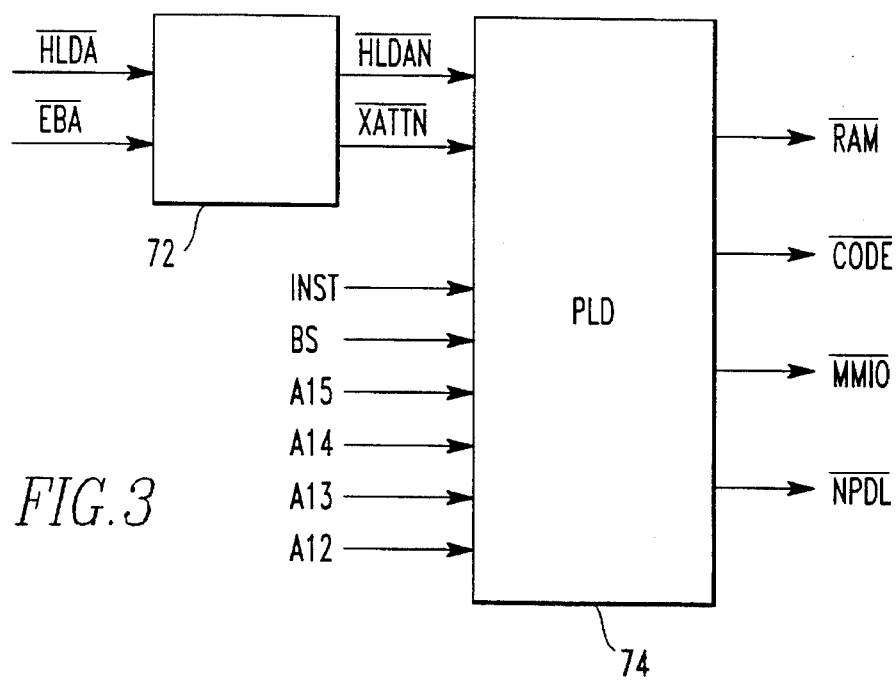

FIG.3

| | ADDRESS | $\overline{EBA}$ | DMA | EQUATION OF SELECT SIGNAL |
|---|---|---|---|---|
| 86 | 0200-1FFF | 0 | YES | $\overline{RAM} = \overline{A15} * \overline{A14} * \overline{A13}$ |
| 88 | 2000-3FFF | 1 | NO | $\overline{CODE} = \overline{A15} * \overline{A14} * A13 * \overline{XATTN}$ |
| 90 | 2000-3FFF | 0 | NO | $\overline{CODE} = \overline{A15} * \overline{A14} * A13 * \overline{XATTN} * \overline{BS} * HLDAN$ |
| 92 | 4000-7FFF | 1 | NO | $\overline{CODE} = \overline{A15} * A14 * \overline{XATTN}$ |
| 94 | 4000-7FFF | 0 | NO | $\overline{CODE} = \overline{A15} * A14 * \overline{XATTN} * \overline{BS} * HLDAN$ |
| 96 | 8000-87FF | 1 | NO | $\overline{MMIO} = A15 * \overline{A14} * \overline{A13} * \overline{A12} * \overline{XATTN} * \overline{BS}$ |
| 98 | 8000-87FF | 0 | NO | $\overline{MMIO} = A15 * \overline{A14} * \overline{A13} * \overline{A12} * \overline{XATTN} * HLDAN$ |
| 100 | 8000-BFFF | 1 | NO | $\overline{CODE} = A15 * \overline{A14} * \overline{XATTN} * INST$ |
| 102 | 8000-BFFF | 1 | NO | $\overline{CODE} = A15 * \overline{A14} * \overline{XATTN} * BS$ |
| 104 | A000-BFFF | 1 | NO | $\overline{NPDL} = A15 * \overline{A14} * A13 * \overline{INST} * \overline{BS} * \overline{XATTN}$ |
| 106 | C000-FFFF | 1 | NO | $\overline{CODE} = A15 * A14 * \overline{XATTN}$ |

FIG.4

METHOD OF SECURELY CONTROLLING DIRECT MEMORY ACCESS (DMA) OF A SHARED MEMORY BY A DMA DEVICE ON AN EXPANSION BOARD

TECHNICAL FIELD

The invention relates in general to microprocessor controlled processes, and more specifically to providing secure direct memory access (DMA) of a shared memory in a process such as a microprocessor controlled refrigeration process.

BACKGROUND ART

In microprocessor controlled transport refrigeration systems, such as transport refrigeration systems for trucks, trailers, containers, and the like, it is necessary to communicate data or status information from a peripheral device to a central controller, such as Intel Corporation's 80C196KB microcontroller, for example. This communication may be accomplished, for example, by serial communications, mailboxes, semaphores, and the like.

In many multi-processor systems, random access memory (RAM) addresses are agreed upon where information or data will be exchanged. The RAM is shared between multiple processors or DMA devices using a time division multiplexing technique. Time division multiplexing, however, requires elaborate timing systems and fast RAM, which are not desirable in a transport refrigeration system because of the attendant higher system cost and complexity. In a transport refrigeration process or system which uses a CPU board to serve a basic refrigeration related product need, and an expansion board, or boards, to add features to the basic product, it is desirable to have a simple low cost basic system, which is maintained as features are added.

In the hereinbefore mentioned 80C196KB microcontroller, signals /HOLD, /HLDA, and /BREQ implement a bus exchange protocol which allows other devices to gain control of the microprocessor's address/data bus. Signal /HOLD is asserted by a peripheral DMA device when the device desires to gain control of the bus to access a shared RAM on the microcontroller's CPU board for reading or writing operations. Signal /HLDA is asserted by the CPU board when the microcontroller is ready to relinquish control of the bus, acknowledging the request and allowing the peripheral DMA device to gain control of the system bus on the CPU board. Signal /HOLD is de-asserted by the. DMA device when the access is completed. If the CPU board desires to regain control of the bus before the external DMA device has de-asserted /HOLD, the CPU board asserts signal /BREQ and regains control of the bus. Thus, a peripheral DMA device can directly access RAM on the CPU board without communicating messages directly to the microcontroller. This is a desirable feature, but it leaves the integrity of other memory components of the system vulnerable. This is especially true in a transport refrigeration application where expansion boards with DMA devices may be added by suppliers other than the manufacturer of the transport refrigeration system.

It is an object of the present invention to have direct memory access (DMA) devices on an expansion board read and write to random access memory (RAM) on a CPU board of a transport refrigeration's microcontroller, while maintaining security of the system by ensuring that the access is confined to a predetermined address range of the RAM, and that no other memory devices of the system may be accessed by the DMA operation. It is a further object of the invention to provide the desired security while utilizing the hereinbefore mentioned /HOLD-/HLDA protocol, or similar protocols.

SUMMARY OF THE INVENTION

Briefly, the present invention is a method of securely controlling direct memory access (DMA) in a microprocessor or system controlled refrigeration process having a CPU on a CPU board which has an address/data bus, means for selectively connecting an expansion board to the CPU board, and a random access memory (RAM) on the CPU board having a specific address range which is accessible by a DMA device on the expansion board after the CPU board relinquishes control of the address/data bus to the DMA device in response to a bus access request. The method includes the step of providing a plurality of logic signals, including a first logic signal having logic levels which indicate whether or not the CPU board is in control of the address/data bus. The method further includes the steps of providing memory select signals for selecting different memory address ranges of one or more memory devices which are true in response to different Boolean equations. Each of the Boolean equations includes predetermined combinations of predetermined ones of the logic signals, and, according to the invention, the first logic signal is included in the Boolean equation of at least one of the memory select signals, wherein the at least one memory select signal can only be driven to a true level when the logic level of the first logic signal indicates that the CPU board is in control of the address/data bus.

In a preferred embodiment of the invention, the method further includes the steps of providing a second logic signal having logic levels which indicate whether or not an expansion board is connected to the CPU board, and including the second signal in the Boolean equation of each memory select signal associated with a memory address range to which DMA access is denied, wherein certain of the memory select signals can only be driven to a true level when the logic level of the second logic signal indicates that there is no expansion board attached to the CPU board, and the at least one memory select signal can only be driven to a true level when the second and first logic signals respectively indicate that an expansion board is connected to the CPU board, and that the CPU board is in control of the address/data bus.

BRIEF DESCRIPTION OF THE DRAWINGS

The invention will become more apparent by reading the following detailed description in conjunction with the drawings, which are shown by way of example only, wherein:

FIG. 3 is a schematic diagram illustrating the development of certain logic signals used in the invention; and FIG. 4 is a chart which illustrates Boolean equations prepared according to the methods of the invention, which securely restrict direct memory access to a specific address range of a shared RAM.

DESCRIPTION OF PREFERRED EMBODIMENTS

Figure 1:
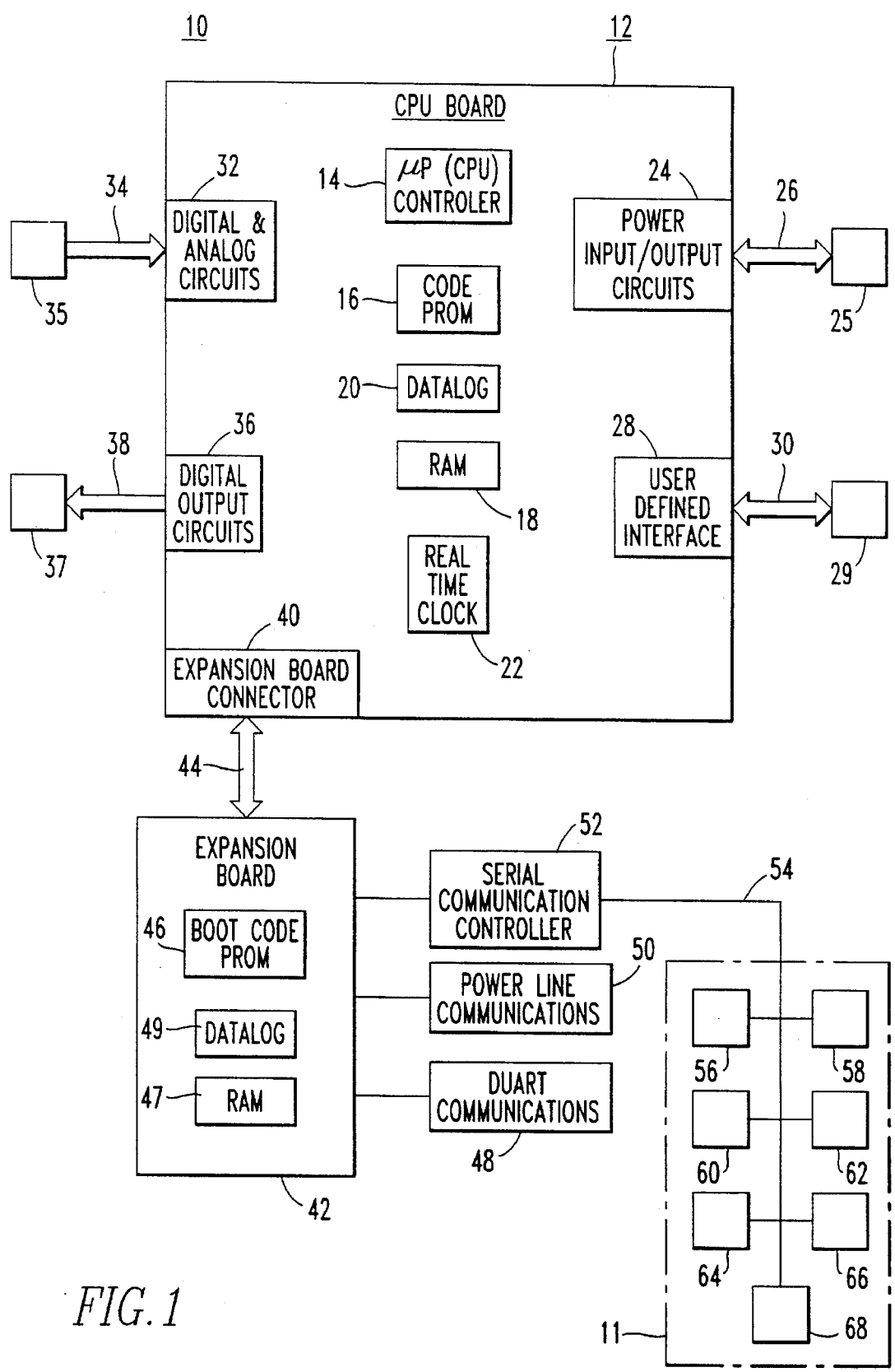
FIG. 1 is a block diagram of a microprocessor controlled refrigeration process or system having a CPU and an optional expansion board, which system may be operated according to the methods of the invention.
Figure 2:
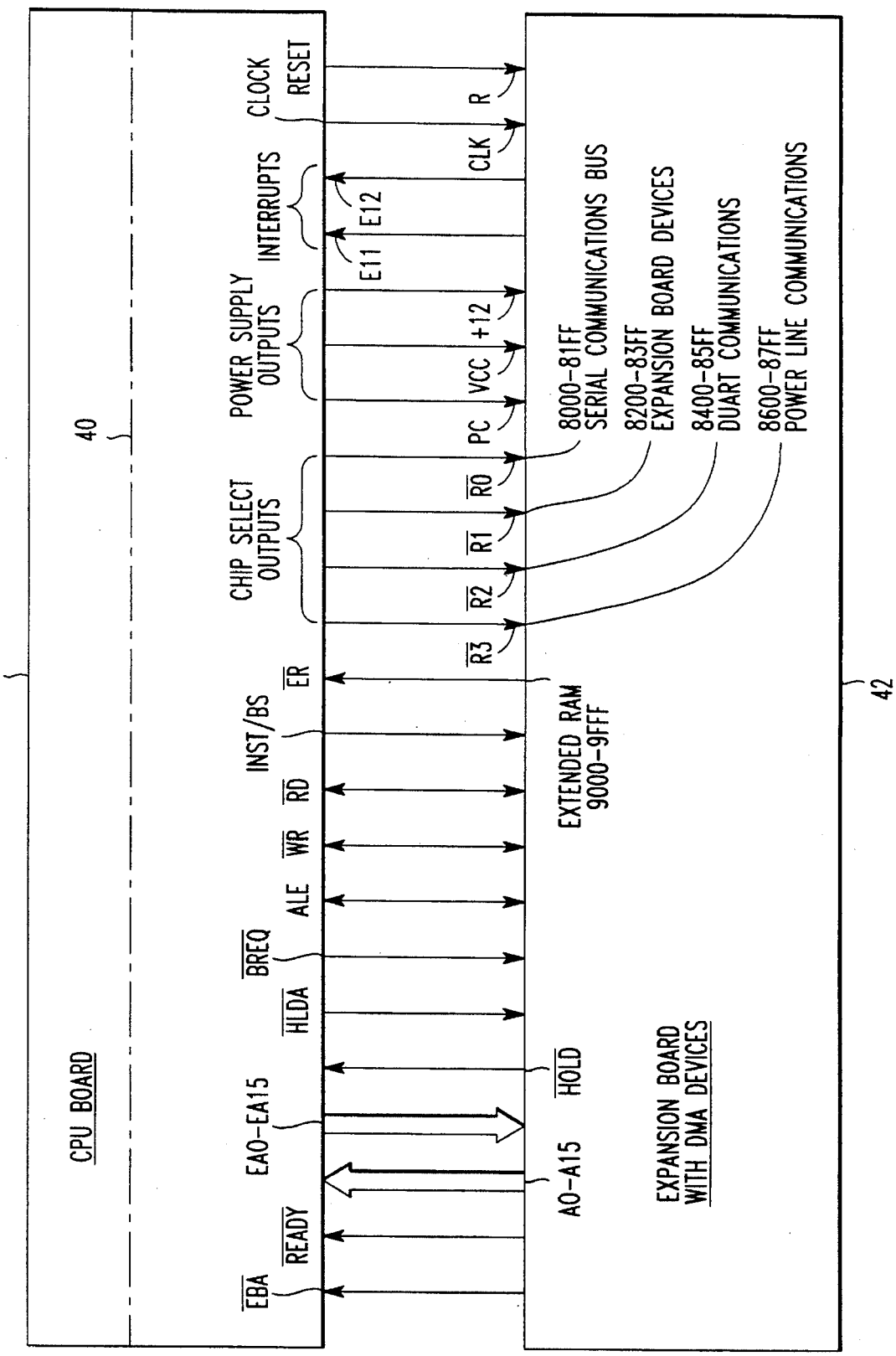
FIG. 2 illustrates the functions of various connector pins in an expansion board connector resident on the CPU board for receiving different expansion boards.

Referring now to the drawings, FIGS. 1 and 2 are similar to FIGS. 1 and 2 of our co-pending application Ser. No. 08/010,081 filed Jan. 27, 1993, which application is directed to a microprocessor controlled transport refrigeration process or system 10 which may utilize the teachings of the invention.

A transport refrigeration system, shown generally at 11, requires certain basic controls, and the basic controls are combined with a plurality of different special features, according to the specific application of the transport refrigeration system. For example, transport refrigeration systems are utilized on trucks, trailers, and containers, with each having different electrical and electronic features available, including remote monitoring via satellite communications, remote monitoring via power line, and the like.

The basic control functions applicable to all applications of refrigeration system 11 are provided on a printed circuit board 12, hereinafter called CPU board 12, which includes a microprocessor controller chip 14 having a central processing unit (CPU) resident thereon. For purposes of example, it will be assumed that controller chip 14 is the hereinbefore mentioned 80C196KB 16-bit CHMOS microcontroller available from Intel Corporation, but other microprocessors having similar bus mastership protocol may be used.

Microprocessor 14 has a sixteen bit multiplexed address/data bus A0–A15 which, for purposes of the example, will be assumed to be demultiplexed into an 8-bit data bus and a 16-bit address bus, but a 16-bit data bus may be utilized. The address/data bus, along with bus control signals including a ready-not signal (/READY), an address latch enable signal (ALE), a write-not signal (/WR), and read-not signal (/RD), are used to access external memory devices. Microprocessor 14 uses an instruction fetch output logic signal INST which is asserted, or high, for instruction fetches from external memory, and de-asserted, or low, during data reads and writes.

CPU board 12 further includes a code socket for receiving a programmable read-only memory (PROM) 16 which stores code or operating instructions. PROM 16 may be an erasable PROM (EPROM), an electrically erasable PROM (EEPROM), or a flash EPROM, which permits electrical erasing while the memory device is installed.

CPU board 12 includes a socket for a random access memory (RAM) 18 for storing data relative to the operation of the microprocessor controlled transport refrigeration system 10, a socket for a data logging memory 20, such as a flash PROM, and a real time clock 22 for time stamping data stored in the data logging memory 20.

CPU board 12 includes power input-output circuits 24, which receive a primary input voltage and which outputs regulated voltages to external circuit boards, shown generally at 25, via a power connector 26. CPU board 12 further includes user-defined interface circuits 28, which communicate with such devices as a display and keyboard, shown generally at 29, via a connector 30. CPU board 12 also includes digital and analog input circuits 32 which receive contact closure signals as well as analog inputs from various refrigeration system related sensors, such as temperature, pressure and speed sensors, shown generally 35 via a connector 34. CPU board 12 includes digital output circuits 36, such as for providing TTL outputs for driving relays and other power switching devices, shown generally at 37, via a connector 38.

CPU board 12 also includes an expansion board connector 40. Expansion board connector 40 allows application specific expansion printed circuit boards, such as expansion board 42, to be directly connected to the CPU board, with the direct plug-in connection being indicated generally at 44. It is this expansion board feature which requires the secure direct memory access of RAM 18 according to the teachings of the invention, as will be hereinafter explained.

Expansion boards, such as expansion board 42, may include expanded code, such as code which may not be rewritten, called "boot" code, which is illustrated generally as boot code PROM 46. Expansion board 42 may also be provided with a random access memory (RAM) 47 and a data logging memory 49. Expansion board 42 may also be used to implement communications interfaces, such as DUART communications 48 for remote monitoring of transport refrigeration system 10 via radio, including satellite communications; power line communications 50, such as for remote monitoring refrigerated containers via terminal and shipboard wiring; and for serial communications via a serial communications controller 52 and a high speed serial bus 54. U.S. Pat. No. 4,885,564, which is assigned to the same assignee as the present application, shows a power line communication system for monitoring refrigerated containers, for example. U.S. Pat. Nos. 4,402,191; 4,409,797; and 4,424,684, which are assigned to the same assignee as the present application, illustrate typical refrigerated container units.

The serial communications controller 52, which may be Intel Corporation's 82526 for example, may communicate with a plurality of control and sensor devices associated with refrigeration system 11, which control and devices are connectable to bus 54. Examples of such control and sensor devices include refrigerant compressor control 56, engine control 58, evaporator control 60, humidity control 62, atmosphere control 64, motor speed control 66, remote sensors 68, and the like. Our co-pending application Ser. No. 08/010,092, filed Jan. 27, 1993, (now U.S. Pat. No. 5,323,385) sets forth a bus protocol which may be used for communicating between serial communications controller 52 and devices plugged into serial data bus 54.

FIG. 2 illustrates expansion board connector 40 in greater detail, setting forth certain of the signals and voltages which are passed between CPU board 12 and an expansion board 42 which is plugged into expansion board connector 40. When an expansion board 42 is plugged into connector 40, it automatically drives a connector pin low to provide a low or true expansion-board-attached signal /EBA. When expansion board 42 is disconnected, signal /EBA goes high.

A signal /READY goes low when CPU board 12 accesses a slow memory device on expansion board 42, and the CPU board 12 inserts a wait state in response thereto. Signals A0–A15 are 16 address bits from a DMA device on expansion board 42 into RAM 18 on CPU board 12. Signals EA0–EA15 are 16 buffered outputs from the CPU's address line from CPU board 12 which allows the CPU board to access memory devices on expansion board 42.

Signals /HOLD, /HLDA, and /BREQ are part of the hereinbefore mentioned bus exchange protocol of the 80C196KB, which allow other devices to gain control of the microprocessor bus. Signal /HOLD is asserted by expansion board 42 when a device on expansion board 42 desires to gain control of the bus to access RAM 18 for reading or writing operations. Signal /HLDA is asserted by the CPU board 12 when the bus is released, acknowledging the request, allowing the expansion board 42 to gain control of the system bus on the CPU board 12. Signal /HOLD is de-asserted by the expansion board 42 when the access is completed. When CPU 14 desires to regain control of the bus before the external device has de-asserted /HOLD, signal /BREQ is asserted by CPU 14 to regain bus mastership.

Signals ALE, /WR and /RD are bi-directional latchenable, write and read bus control signals, respectively, which enable reading and writing to devices on CPU board 12 and on expansion board 42.

Signal /ER is asserted by expansion board 42 when the expansion board 42 has extended non-paged RAM in the address range 9000-9FFF.

Signal INST/BS is a logical OR of the INST and BS signals. When asserted it allows the CPU board 12 to access boot code on expansion board 42, and when it is de-asserted it allows CPU 14 to access memory mapped I/O, data logging memory 49 or RAM 47 on the expansion board 42.

Signals /R0, /R1, /R2 and /R3 are chip select signals asserted by CPU board 12 for selecting different functions which may be implemented by the particular expansion board 42 which is plugged into connector 40. For example, signal /R0 provides an expansion interface chip select for the hexadecimal address range 8000-81FF, which is used for the serial communications controller 52 and serial bus 54 when the expansion board 42 utilizes a high speed serial bus, or for other purposes when such a bus is not part of transport refrigeration system 10. Signal /R1 is an expansion interface chip select for the address range 8200-83FF, which is used for various registers which are on the expansion board 42, including page control, status, hardware configuration, and circuit board ID registers. Signal /R2 is an expansion interface chip select for the address range 8400-85FF, which is used when the expansion board 42 has a DUART communications chip. Signal /R3 is an expansion interface chip select for the address range 8600-87FF, which is used when the expansion board 42 has a power line communications interface.

Power supply outputs from CPU board 12 to expansion board 42 include a signal PC, a voltage VCC, and a voltage +12. Signal PC is an output to expansion board 42 which controls a power-down input on any device on expansion board 42 which uses power-down control. Signal VCC is a +5 volt DC power supply line to expansion board 42, and the +12 volt DC line is used to re-program any flash PROMs which may be on the expansion board 42.

Signals EI1 and EI2 are expansion board generated interrupts which are connected to interrupt inputs of the CPU 14. An interrupt EI0, while not shown in FIG. 2, may also be utilized.

Signal CLK is a clock output from the CPU oscillator to the expansion board 42 which permits synchronization of bus cycles.

Signal R is an external reset provided by CPU board 12 which resets logic on expansion board 42.

Referring now to FIG. 3, there is shown a schematic diagram of a circuit 70 for generating certain logic signals according to the teachings of the invention. The hold acknowledge signal /HLDA generated by controller 14, which is true (low) when controller 14 relinquishes control of its address/data bus to expansion board 42 in response to a true signal /HOLD generated by the expansion board 42, is converted to a logic signal /HLDAN by logic signal converter means 72. Signal /HLDAN is at a logic one level when controller 14 is in control of its address/data bus, and at a logic zero level when controller 14 has relinquished control of its address/data bus to a DMA device on expansion board 42 for a DMA read or write operation to a specific memory address range of RAM 18 on CPU board 12.

The "expansion board attached" signal /EBA, which is responsive to whether or not expansion board 42 is plugged into the expansion board connector 40, is converted by logic signal converter means 72 to a logic signal /XATTN. Logic signal /XATTN is at a logic one level when expansion board 42 is not attached to CPU board 12, and at a logic zero level when expansion board 42 is attached to CPU board 12.

Logic signals /HLDAN and /XATTN, along with logic signals INST, BS, and the high order address bits A15, A14, A13 and A12 of the address/data bus of controller 14, are all applied to inputs of a programmable logic device (PLD) 74. PLD 74 is programmed to provide chip select signals /RAM, /CODE, /MMIO and /NPDL for selecting various memory components on the CPU board 12 and memory mapped I/O. For example, chip select signal /RAM, when true, selects RAM 18; chip select signal /CODE, when true, selects code PROM 16; chip select signal /NPDL, when true, selects datalog 20; and chip select signal /MMIO is an expansion interface chip select for memory mapped I/O, which, when true, selects an expansion interface chip, such as a chip for use with the serial communications interface 52, a chip for expansion board register control, the DUART communications chip 48, or a chip associated with the power line communications interface 50. PLD 74 uses combinatorial logic to create the chip select signals.

FIG. 4 is a chart 76 which lists along a left-hand column 78 certain address ranges of the memory devices on CPU board 12, including code PROM 16, RAM 18, and datalog memory 20, as well as address ranges for memory mapped I/O expansion chip selection. A column 80 of chart 76 indicates whether or not expansion board 42 is attached, by indicating the level of signal /EBA, with "1" indicating expansion board 42 is not attached, and "0" indicating that expansion board 42 is attached. A column 82 of chart 76 indicates whether DMA from a DMA device on expansion board 42 is allowed for each address range, with "yes" indicating that DMA is allowed, and "no" indicating that DMA is not allowed. A column 84 sets forth Boolean equations prepared according to the teachings of the invention for generating the hereinbefore mentioned chip select signals /RAM, /CODE, /MMIO, and /NPDL.

The first row 86 of chart 76 lists an address range in hexadecimal of 0200-1FFF for RAM 18, to which DMA is allowed by a DMA device on expansion board 42. The Boolean equation for generating a true chip select signal /RAM for RAM 18 is /RAM=/A15*/A14*/A13. Thus, after controller 14 has generated a true hold acknowledge signal /HLDA and relinquished control of its address/data bus to expansion board 42 in response to a true request signal /HOLD generated by expansion board 42, a peripheral DMA device on expansion board 42 may generate a true select signal /RAM which enables it to select RAM 18 and to read or write to a correctly addressed memory space thereof. The Boolean equation for chip select signal /RAM utilizes only high order address bits, according to the usual practice of generating chip select signals.

Only correctly addressed read and write DMA operations to RAM 18 is allowed to be made by a peripheral DMA device. The remaining rows of chart 76 illustrate how the invention denies access to all other memory devices and operations on CPU board 12. In row 88 of chart 76 a true chip select signal /CODE for address range 2000-3FFF of code PROM 16 is generated by the Boolean equation:

/CODE=/A15*/A14*A13*XATTN. To provide this true chip select signal /CODE, an expansion board cannot be attached, as the Boolean equation requires that logic signal XATTN be at the logic one level. Since an expansion board is not attached, the Boolean equation in row 88 is not concerned with the level of logic signal HLDAN and thus logic signal HLDAN is not part of the equation. On the other hand, a true chip select signal /CODE for address range 2000-3FFF, when expansion board 42 is attached, as indicated in row 90, requires that both logic signals /XATTN and HLDAN be in the equation, as well as logic signal /BS. The logic level of signal BS differentiates between the code PROM 16 on CPU board 12 and boot code PROM 46 on expansion board, with a logic zero level of signal BS selecting code PROM 16. The Boolean equation, as indicated in line 90 of chart 76, is: /CODE=/A15*/A14*A13*/XATTN*/BS*HLDAN. Signals XATTN and HLDAN are only generated and controlled by CPU board 12, and thus the Boolean equation in row 90 can only be true when an expansion board is attached (/XATTN is a logic zero) and controller 14 is in control of its address/data bus (HLDAN is a logic one). This provides absolute security for maintaining the integrity of this address range of code PROM 16 on CPU board 12. A peripheral DMA device, when granted mastership of the CPU's address/data bus cannot create a true chip select signal /CODE.

In like manner, rows 92 and 94 of chart 76 indicate the Boolean equations for generating a true chip select signal /CODE for address range 4000-7FFF of code Prom 16, without an expansion board 42, and with expansion board 42, respectively. The Boolean equation for the chip select signal /CODE in line 92 is: /CODE=/A15*A14* XATTN. The Boolean equation in line 94 is: /CODE=/A15* A14*/XATTN*/BS*HLDAN.

Rows 100 and 102 of chart 76 indicate the Boolean equations for generating a true chip select signal /CODE for address range 8000-BFFF of code Prom 16, without an expansion board 42. When no expansion board 42 is present, signals INST and BS are used to distinguish between code and data locations of code PROM 16, with the Boolean equations in rows 100 and 102 respectively selecting code and data. The Boolean equation for chip select signal /CODE in row 100 is: /CODE=A15*/A14*XATTN*INST. The Boolean equation for chip select signal /CODE in line 102 is: /CODE=A15*/A14*XATTN*BS.

Row 106 of chart 76 indicates the Boolean equation for generating a true chip select signal /CODE for address range C000-FFFF of code PROM 16 when no expansion board 42 is attached to CPU board 12. The Boolean equation for a chip select signal /CODE for in row 106 is: /CODE=A15*A14*XATTN.

Rows 96 and 98 of chart 76 illustrate the Boolean equations for generating true memory mapped I/O chip select signals /MMIO in address range 8000-87FF, without and with expansion board 42, respectively. The Boolean equation in row 96 is: /MMIO=A15*/A14*/A13*/A12*XATTN*/BS. The Boolean equation in row 98 is: /MMIO=A15*/A14* /A13*/A12*/XATTN*HLDAN.

Row 104 of chart 76 selects address range A000-BFFF, when expansion board 42 is not attached, which is associated with datalog memory 20 on CPU board 12. The Boolean equation is: /NPDL=A15*/A14*A13*/INST*/BS*XATTN.

We claim:

1. A method of securely controlling direct memory access (DMA) in a microprocessor controlled system having a CPU on a CPU board which has an address/data bus, means for selectively connecting an expansion board to the CPU board, and a random access memory (RAM) on the CPU board having a specific address range which is accessible by a DMA device on the expansion board after the CPU board relinquishes control of the address/data bus to the DMA device in response to a bus access request, comprising the steps of:

providing a plurality of logic signals, including the step of providing a first logic signal having logic levels which indicate whether or not the CPU board is in control of the address/data bus, providing memory select signals for selecting different memory address ranges which are true in response to different Boolean equations each comprising predetermined combinations of predetermined logic signals, including said first logic signal in the Boolean equation of at least one of the memory select signals, with the included first logic signal having the logic level which indicates the CPU board is in control of the address/data bus, such that the at least one of the memory select signals can only be driven to a true level when the CPU board is in control of the address/data bus, providing a second logic signal having logic levels which indicate whether or not an expansion board is connected to the CPU board, and including said second logic signal in the Boolean equation of each memory select signal associated with a memory address range to which DMA is denied, with the included second logic signal having logic levels selected such that certain of the memory select signals can only be driven to a true level when the logic level of the second logic signal indicates that there is no expansion board attached to the CPU board, and the at least one memory select signal can only be driven to a true level when the second and first logic signals respectively indicate that an expansion board is connected to the CPU board, and that the CPU board is in control of the address/data bus.

2. The method of claim 1 including the step of providing at least one memory select signal which selects an address range for which DMA is allowed, and including the step of excluding the first logic signal from that at least one memory select signal.

3. The method of claim 1 including the step of providing at least one memory select signal which selects an address range for which DMA is allowed, and including the step of excluding the first and second logic signals from that at least one memory select signal.

4. The method of claim 1, wherein the method is used to control DMA in a microprocessor controlled refrigeration system.

5. A method of securely controlling direct memory access (DMA) in a microprocessor controlled system having a CPU on a CPU board which has an address/data bus, means for selectively connecting an expansion board to the CPU board, and a random access memory (RAM) on the CPU board having a specific address range which is accessible by a DMA device on the expansion board after the CPU board relinquishes control of the address/data bus to the DMA device in response to a bus access request, comprising the steps of:

providing a plurality of logic signals, including the step of providing a first logic signal having logic levels which indicate whether or not the CPU board is in control of the address/data bus, providing memory select signals for selecting different memory address ranges which are true in response to different Boolean equations each comprising predetermined combinations of predetermined logic signals, including said first logic signal in the Boolean equation of at least one of the memory select signals, with the included first logic signal having the logic level which indicates the CPU board is in control of the address/data bus, such that the at least one of the memory select signals can only be driven to a true level when the CPU board is in control of the address/data bus, providing a second logic signal having logic levels which indicate whether or not an expansion board is connected to the CPU board, including said second logic signal in the Boolean equation of each memory select signal associated with a memory address range to which DMA is denied, providing a first type of Boolean equation which requires said second logic signal to be at a level which indicates no expansion board is attached in order to be driven to a true level, providing a second type of Boolean equation which requires said second signal to be at a level which indicates an expansion board is attached in order to be driven to a true level, and including the step of including the first logic signal in each of said second type of Boolean equations, wherein the second type of Boolean equation can only be driven to a true level when the second and first logic signals respectively indicate that an expansion board is connected to the CPU board, and that the CPU board is in control of the address/data bus.

6. The method of claim 5 including the step of providing at least one memory select signal which selects an address range for which DMA is allowed, and including the step of excluding the first logic signal from that at least one memory select signal.

7. The method of claim 5 including the step of providing at least one memory select signal which selects an address range for which DMA is allowed, and including the step of excluding the first and second logic signals from that at least one memory select signal.

8. The method of claim 5, wherein the method is used to control DMA in a microprocessor controlled refrigeration system.

* * * * *